Figure 1:
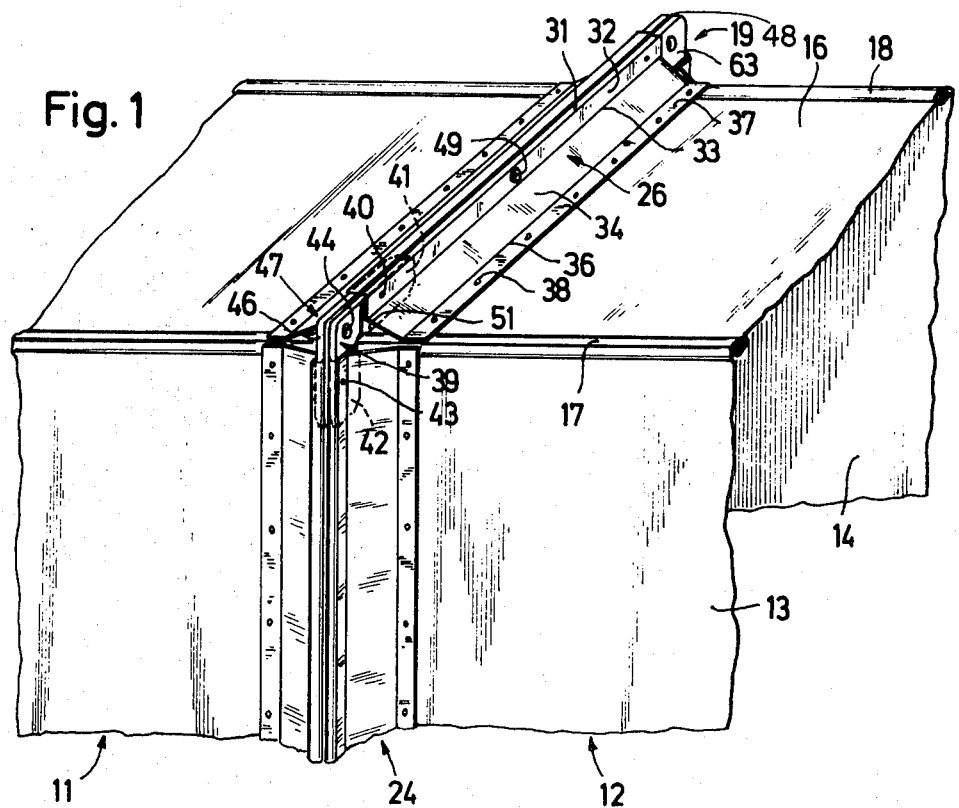

United States Patent [19]
Mez

[11] 3,712,650
[45] Jan. 23, 1973

[54] FLANGE CONNECTION FOR AIRCONDITIONING DUCTS

[76] Inventor: Georg Mez, Gartenstrasse 30A, 7416 Gonningen, Germany

[22] Filed: Dec. 10, 1970

[21] Appl. No.: 96,746

[30] Foreign Application Priority Data

Dec. 10, 1969 Germany...............G 69 47 793.6
July 9, 1970 Germany................P 20 34 005.0

[52] U.S. Cl..................285/405, 287/54 C, 285/424
[51] Int. Cl.........................................F16l 23/00
[58] Field of Search....................285/424, 414, 405; 287/189.36 H, 54 A, 54 B, 54 C, 129, 130

[56] References Cited

UNITED STATES PATENTS 565,499 8/1896 Pattison............................285/424 X
3,199,901 8/1965 Jeppsson.........................285/424 X Primary Examiner—David J. Williamowsky
Assistant Examiner—Wayne L. Shedd
Attorney—Milton Robert Kestenbaum

[57] ABSTRACT

A four-sided flange is slidable and fastened over the free end of a sheet metal duct. The flange is hollow and has a pair of parallel walls perpendicular to the duct. A solid angle piece is insertable at each corner of the flange into the space between the walls and fastened. The thickness of the angle piece corresponds to the space between the walls.

7 Claims, 5 Drawing Figures

PATENTED JAN 23 1973

3,712,650

SHEET 1 OF 2

INVENTOR.
GEORG MEZ
BY M.R. Ketl

FLANGE CONNECTION FOR AIRCONDITIONING DUCTS

The invention relates to a prefabricated flange connection for rectangular air conditioning ducts of large dimension, with a flange possessing four sheet metal frame pieces and consisting of a hollow section with open edge, which flange can be slipped on to the free end of a duct and there be attached by spotwelds or rivets and with a metal elbow that can be inserted with either end into a flange.

In a known flange connection of this type the elbow consists of two parts, which essentially set hollow-fashion head-on within the area of the frame-pieces. This produces a spring effect, so that the elbow is held within the frame piece by friction. The horizontal arm of the elbow is well able to carry the often heavy load of the air conditioning ducts. On the other hand, the vertical arm of the elbow often slips out of its frame piece, because the frictional force is too weak. The scarf joint between the perpendicular walls and the upper horizontal wall of the air conditioning duct is then overloaded, and opens.

In the known flange connection it is sought to meet this problem in that the frame pieces are welded together on its inside at the point where they set vertically one upon the other and their end planes lie close to each other. This means that for purposes of assembly a welding machine must be included as an extra assembly tool. In addition, for welding one must insert a bent piece of metal sheet between the frame pieces that are to be welded together, in order that the welding compound shall not fill that area in the corner of the flange connection into which subsequently the corner of the air conditioning duct must be able to be inserted. Unlike spot welding, in electrode welding highly skilled personnel must be used, and even such personnel may inadvertently weld along the bent piece of metal, so that later it cannot be withdrawn any more, with the formation of globules, and the corner area of the air conditioning can no longer be inserted properly or the welded joint is defective because it is difficult to weld the frame pieces made of sheet metal.

The two walls of the frame pieces projecting from the duct stand in the known arrangement at a considerable and sharp angle to each other. Now it can happen of course that in air conditioning ducts of large dimension the corner areas of two air conditioning ducts that are to be joined may be in alignment and that nevertheless the frame pieces between these corner or angle areas are vertically staggered. Now in the known flange connection it is not possible here to bring the frame pieces again into alignment by simple screw connection, since in addition to the latter there are needed two offsetting pieces that will compensate the two pointed angles of the two frame pieces.

Air conditioning ducts are always built up of sectional air conditioning ducts, with flange connections at their ends, by means of which the sectional air conditioning ducts can be joined to form a single air conditioning duct. The sectional air conditioning ducts must align with each other perfectly. This can only be obtained if the flange of every sectional air conditioning duct sets so that its surface facing the immediately adjacent sectional air conditioning duct stands precisely in the corner that one is seeking. Where the air conditioning ducts run straight, such surface will have to lie in a plane that is exactly perpendicular to the lengthwise stretch of the air conditioning duct.

If this requirement is not met, and if by forceful turning of the screw the flanges of two ducts are drawn together, the large-surface walls of the ducts might buckle, the sealing tightness is lost or else the air conditioning duct simply becomes quite worthless.

The end planes of the duct walls now run at all times exactly parallel to those planes that are required for a clean connection.

In known flange connections the end planes of the walls are so deeply thrust into the frame pieces as to make them unseen, because they have been covered by the thickness of the corner or angle pieces. Since one could not very well see how far the end areas of the walls stretched into the frame pieces it was found necessary to mark off on the duct the depth of penetration of the walls for all four frame pieces. Since the entire length of a frame piece is not marked off but rather the marking is only made in the end area of same, eight markings become necessary.

Merely hammering the flange upon the walls with a rubber hammer cannot be done. Because if the flange will no longer submit to being hammered on, this could also be so because the end plane of the walls have too soon met with obstacles without yet having penetrated sufficiently into the flange. In such a case the flange would be connected askew to the walls.

A further disadvantage is: that there remains for the walls only a narrow but definite crack between the inside periphery of the angle piece and the inside of the parallel areas of the frame piece. Depending upon the breadth of this crack only ducts possessing a precise wall thickness range, such as, for example, from 0.7 to 1.1 mm can be used.

Since the crack is of course also located within the wall distortion or bending range, and since precisely there is where in large air conditioning ducts a multilayer, for example, a four-layer fold occurs, the fold must there be undone, that is, so many of the fold layers be removed that only a single breadth of material remains. So that the fold is weakened precisely at the place where it would have to assume the greatest force, and indeed to such a degree that the walls no longer have any form-locking consistency. Of course, there is the alternative of providing the folds for only one-half the height of the walls, that is, not within the bend or distortion area. For still other technological reasons this is a limitation that is only most reluctantly considered.

It is the object of the invention to devise a flange connection, wherewith it is possible to permit of a connection between the angle pieces and the frame pieces by means of spot welds, to considerably reduce the labor time in performance, and to obviate the need of an electrode welding machine.

According to the invention, this problem is solved in that the hollow edge of the frame pieces that is vertical to the duct has two approximately parallel wall areas, that the angle piece is solid and that the thickness of the angle piece corresponds to the clearance of the wall areas.

It is a favoring factor if the first area facing an adjacent duct corresponds approximately to the height of the hollow edge and stands vertically to the duct, if the second range or area that is parallel to the first proceeds from the periphery of the hollow edge as far as part of the height of the flange, preferably half the height, and thence proceeds at an obtuse angle to the duct. Thereby one has available for spot welding a sufficiently large area, without the frame pieces made of comparatively thin metal sheet losing strength in the lengthwise direction of the duct.

It is advisable, too, if the angle piece is suitably insertable into the hollow edge. This facilitates the obtaining of especially good spot welding results, yet this self-substance connection must not absorb all the forces that arise.

It is necessary, if a straight-through bore is provided in the wall ranges which are parallel to each other, for purposes of screw connection, that it should be in alignment with a corresponding straight-through bore of the adjacent frame piece. Thus in simple manner one manages to bring the frame pieces into alignment within the range or area of the screw connection, so that the tight seals present between the flange connections can accomplish their purpose perfectly.

It is advisable that two adjacent frame pieces shall have with their ends belonging to the same angle piece a clearance between them with the outer of the parallel areas, such clearance permitting a view of the bend area of the two corresponding walls, and that the end plane of the walls should at least have a definite clearance within the visible bend range from the surface of the angle piece which there is its facing surface. In this way marking is obviated and one is in a position to affix the flange to the duct in such manner that it is easy to check whether it sets right.

It is advisable that the clearance being nil the end plane shall at least rest within the bend area upon the angle piece. In this way special clearance holding devices are obviated for purposes of maintaining a definite distance or clearance, and one knows that the flange sets right if the end plane rests upon the angle piece. This can be readily checked without, for the purpose, having to seek any especially favorable inspection stance.

It is a necessity that the hollow edge shall be as wide as the side of the angle piece. Then the end plane not only lies within the bend area, but practically rests upon the entire length of the frame sides, so that a quite definite detent is obtained, which is not bent round even by an inadvertent strong blow of the rubber hammer, or mallet.

It is advisable that the otherwise flat angle piece, in the area not covered by the frame pieces and the end plane of the walls, should in fact stand so far in relief that upon the flange surface facing the adjacent flange an even surface is obtained. The tight-seal problem is then readily solved, as it is only necessary to attach a strip of foam plastic that is not required to even out any undesirable differences in level.

It is necessary that the free end area of the frame sides shall show at least a bevel, lying perpendicular to the level of the angle piece. It then becomes easier to insert the angle piece into the hollow edge.

It is advisable that the bend area of the two walls shall be a complete not undone fold. The tight seal is then retained within the flange area, the work of undoing the fold is spared, and because of the fold the end plane becomes appreciably greater.

It is advisable that the parallel areas of the frame pieces shall extend at a different distance from the hollow edge. It then becomes easier to introduce the end planes of the walls between the areas.

It is advisable that the length of the outer parallel area shall be the smaller. This arrangement is especially desirable if, as is mostly the case, one operates observing the flange from without.

Additional advantages and features of the invention are apparent from the below description of a preferred embodiment. In the drawing:

FIG. 1 a diagrammatic cut-off representation of two sectional air conditioning ducts.

Figure 2:
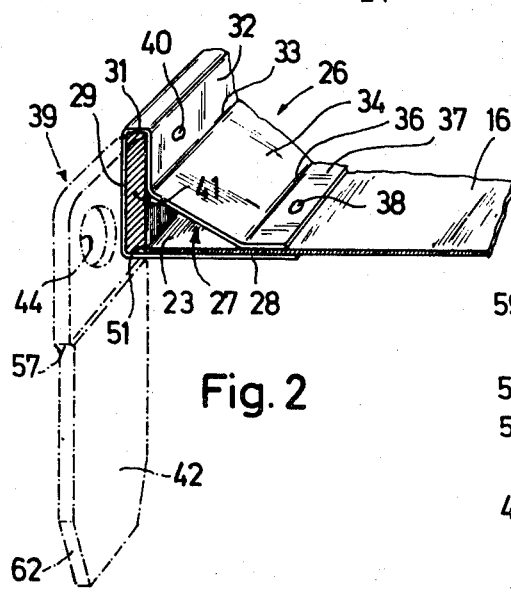

FIG. 2 as compared to 1 an enlarged, partly cut off unit from the corner area of the right flange connection diagrammatically shown.

Figure 3:
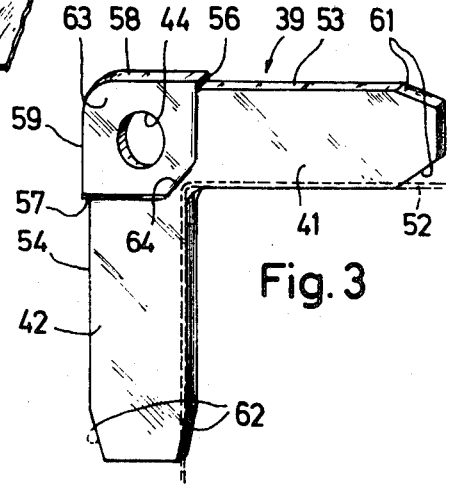

FIG. 3 diagrammatic representation of an angle piece.

Figure 4:
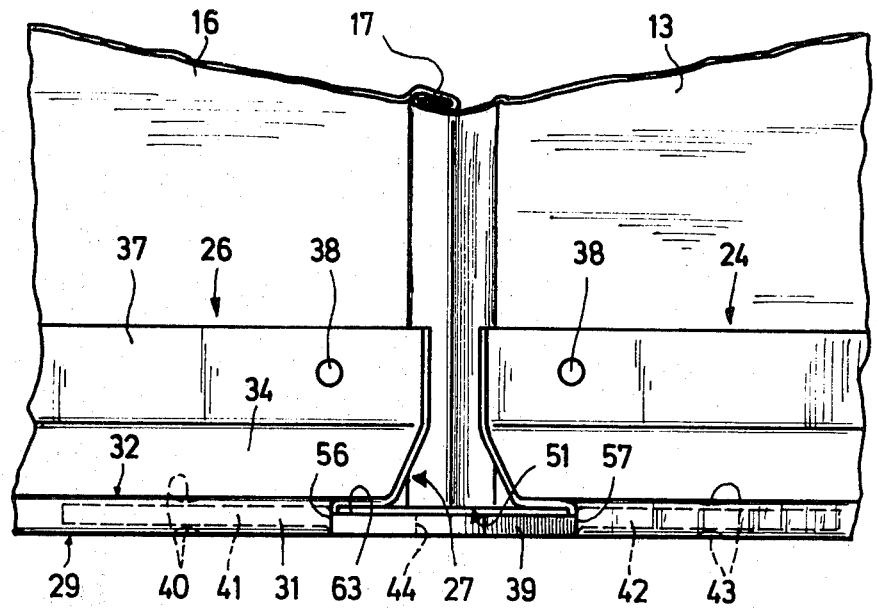

FIG. 4 view of a corner or angle seen from without, vertically to the lengthwise stretch of the sectional air conditioning duct.

Figure 5:
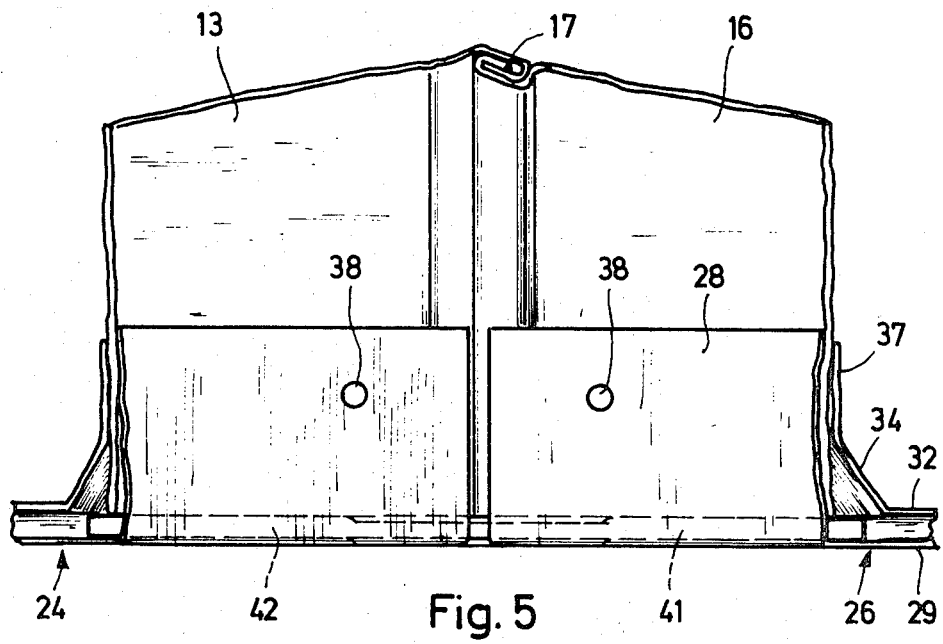

FIG. 5 view as per 4, but from within.

Since both air conditioning ducts 11 and 12 are symmetrical mirror-image fashion, we shall in what follows only describe in greater detail the duct pictured on the right in FIG. 1. Duct 12 has two lateral walls 14 and 13, a top wall 16, and a bottom wall not appearing in the diagram. Top wall 16 is connected with side wall 13 over a fold 17, while top wall 16 is connected with side wall 14 by means of a fold 18.

About left end 23 four frame pieces are set, of which frame pieces 24 and 26 are shown. Every frame piece has a hollow edge 27, the periphery of which is outlined by a horizontal area 28 in FIG. 2, a thereto adjacent vertical area 29 on the left, a bend 31, an area 32 running parallel to area 29 and downward and which at about half the height, following a sharp bend 33, passes at an angle of less than 45° into a sloping area 34, upon which after still another sharp bend 36, a horizontal area 37 follows. Between areas 28 and 37 a jaw is formed in the not completed assembly, through which end 23 can be thrust in the position illustrated in FIG. 2. Area 28, top wall 16 and area 37 there lie flush one upon the other, so that spotweld spots 38 can be placed, which connect frame piece 26 with top wall 16. The same holds of course for the other frame pieces.

Into hollow edge 27 and adjacently to areas 29 and 32 a solid metal angle piece 39 with its single frame side 41 is inserted. The other frame side 42 ensconces in the corresponding hollow side of frame piece 24. Area 29 along frame side 41 and area 32 lie sufficiently flush together for spot welding, so that by means of spotweld spot 40 angle piece 39 can be connected with frame piece 26. The same thing is done for frame piece 24 by spotweld spot 43.

Further, in angle piece 39 a bore is provided, which aligns with a corresponding bore in an adjacent angle piece 46. This relates to a flange connection 47. Between flange connection 19 and flange connection 47 there is a seal 48 designed to fit the space. Through angle pieces 39, 46 a screw is thrust — as also in the case of the other three pairs of angle pieces — and the screw is tightened, so that flange connection 19, 47 are sealed against each other.

At half length of the frame piece 26 there is a through bore 49 in the areas 29, 32, which bore aligns with a similar bore in the opposite frame piece of flange connection 47. If, then, by reason of manufacturing tolerances, damage in transportation, or the like, the opposite frame pieces do not align, a screw can be set through the through-bore 49 and its opposite piece. If the through-bores align, then of course the adjacent areas of the frame pieces will, also, so that seal 48 can fully accomplish its purpose.

Angle piece 39 with its frame pieces 41, 42 is just as wide as the perpendicular part of the hollow edge 27, that is, it extends from bend 31 to area 28. Area 29 rests rectangularly without any major bend upon area 28. In particular, on the inside there is practically no bend. The inwardly lying end planes of frame sides 41, 42 therefore lie flush on the inside with the corresponding areas 28.

Upon angle piece 39 lies end plane 51 of side wall 13 and top wall 16. Of course, this is also the case for the other corners or angles that are not described. The path 52 of the area with which end plane 51 flushes is indicated in FIG. 3 in broken lines. As can be seen from FIG. 1, it can be accurately observed whether end plane 51 lies flush or not.

The outer end planes 53, 54 of frame pieces 41, 42, following a break 56, 57, are moved in exactly in the amount inward corresponding to the contour of bend 31 and the thickness of the sheet metal in this area, so that bend 31 aligns with the surfaces remaining standing 58, 59 seen in the outer peripheral form.

Frame pieces 41, 42 have a bevel 61, 62, by which frame pieces 41, 42 can be more readily thrust into the hollow edge 27.

In area 63 visible in FIG. 3, the angle piece is reliefed out of the drawing plane so far to the rear as corresponds to the material thickness of area 29, so that the rear of area 63 flushes with area 29 and lies in a single plane. Area 63 is not altogether rectangular, but rather slopes at 45° at 64, for the very reason in order that end plane 51 of walls 13, 16 can rest flush upon a traversing plane there as can the location of fold 17. This considerably enhances the seal tightness as compared to the known embodiments, in which there always remains a crack over which will practically never seal.

As can be seen in FIG. 2, area 37 does not extend so far to the right as area 28, which facilitates the insertion of walls 13, 14, 16.

What I claim is:

1. A prefabricated flange connection for large dimension rectangular air conditioning ducts comprising flange means comprising duct wall-engaging means adapted to be slid upon and fastened upon the free end of a duct, a plurality of sheet metal frame members, each being hollow and open at both ends and having two substantially parallel, spaced-apart planar wall areas forming a recess between them, which run substantially perpendicular to the plane of the duct wall to which the flange means is fastened, the end portions of adjacent frame members having a clearance between them at least at one of said parallel wall areas which allows a view of the bend area between adjacent walls of the duct and the ends of adjacent duct walls, and a solid metal angle piece having end portions which are matingly insertable into the recesses of adjacent frame members, the thickness of the insertable portion of the angle piece corresponding to the separation between the parallel wall areas of the frame members, the portion of the angle piece not inserted within a recess of a frame member being raised from the plane of its inserted portions forming with the exterior of said parallel wall areas a flat surfaced flange means, the ends of the adjacent duct walls resting against the angle piece at least in the visible bend area.

2. A flange connection according to claim 1 in which a first of said parallel wall areas extends approximately the height of the frame member and a second of said parallel wall area extends from the height of the frame member a part of the distance to the duct and thence the wall runs at a slanted angle to the duct for providing bracing strength and clearance between the end portions of adjacent frame members.

3. A flange connection according to claim 1 in which the inserted portions of the angle piece have at least one bevel which runs perpendicular to the plane of the angle piece.

4. A flange connection according to claim 1 in which the bend area of the adjacent duct walls is a complete, unopened fold.

5. A flange connection according to claim 21 in which each frame member has a second pair of substantially parallel wall areas, which wall areas extend different distances relative to each other and provide jaw means for engaging with and fastening upon in inserted free end of the duct.

6. A flange connection according to claim 5 in which the length of the outer one of said second pair of parallel wall areas relative to said duct wall extends a shorter distance than the other one of said parallel wall areas.

7. A flange connection according to claim 1 in which the wall areas have a through bore for a screw connection which registers with a corresponding through bore of an adjacent flange means on an adjacent duct.

* * * * *